(12) United States Patent
Ballintine et al.

(10) Patent No.: US 6,366,556 B1
(45) Date of Patent: Apr. 2, 2002

(54) SELF-HEALING NETWORKS USING VIRTUAL RINGS

(75) Inventors: James E. Ballintine, Colts Neck, NJ (US); Mark A. Bordogna, North Andover; Wilhelm Kremer, Andover, both of MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/102,171

(22) Filed: Jun. 22, 1998

(51) Int. Cl.[7] .................................................. H04J 3/00
(52) U.S. Cl. ....................... 370/216; 370/235; 370/252; 370/395; 370/437; 370/465; 370/907
(58) Field of Search ................................. 370/216, 217, 370/218, 221, 222, 223, 224, 227, 313, 437, 465, 252, 235, 238, 395, 397, 401, 905, 906, 907

(56) References Cited

U.S. PATENT DOCUMENTS 5,159,595 A * 10/1992 Flanagan et al. ........... 370/224
5,831,545 A * 11/1998 Murray et al. .............. 370/313
6,144,633 A * 11/2000 Ikeda et al. ................. 370/217

* cited by examiner

*Primary Examiner*—Douglas Olms
*Assistant Examiner*—Shick Hom
(74) *Attorney, Agent, or Firm*—Joseph E. Funk

(57) ABSTRACT

Methods and apparatus are disclosed for providing virtual rings in SONET networks. By using an unused byte in the SONET path overhead, in conjunction with multiframe operation, restoration is performed at the sub-network connection layer or path layer to provide a finer granularity of protection which provides more efficient use of bandwidth. By restoring the operation of the SONET path overhead before exiting a virtual ring created using the present invention, the present virtual ring can be applied to the existing SONET network. Since a virtual ring provides restoration at a path level, a virtual ring can be comprised of various SONET rate interfaces. Further, restoration circuits are not dedicated, but are shared to create virtual rings as needed, which increases bandwidth efficiency and which are automatically and quickly created without the need for a centralized controller.

21 Claims, 9 Drawing Sheets

SONET PATH OVERHEAD (POH) BYTE Z3 OR Z4

| B7 | B6 | B5 | B4 | B3 | B2 | B1 | B0 |
|---|---|---|---|---|---|---|---|
| IEC-4 | IEC-3 | IEC-2 | IEC-1 | APS-4 | APS-3 | APS-2 | APS-1 |

FIGURE 3

MULTIFRAME

| | B3 bits | | B0 |
|---|---|---|---|
| Frame 1 | F1 | 3 | 2 | 1 |
| Frame 2 | F2 | 6 | 5 | 4 |
| Frame 3 | F3 | 9 | 8 | 7 |
| Frame 4 | F4 | 12 | 11 | 10 |
| Frame 5 | F5 | 15 | 14 | 13 |
| Frame 6 | F6 | 18 | 17 | 16 |
| Frame 7 | F7 | 21 | 20 | 19 |
| Frame 8 | F8 | 24 | 23 | 22 |

FIGURE 4

MULTIFRAME

W - Insert VR APS message A to E
X - Capture VR APS message A to E
Y - Insert VR APS message E to A
Z - Capture VR APS message E to A W - Insert IEC nibble A to E
X - Read IEC nibble A to E
Y - Insert IEC nibble E to A
Z - Read IEC nibble E to A

IEC FLOW IN VR

W- Internal VR Failure
  ( IEC = 1111 ) AIS
  No Failure IEC=0000
X - External Failure
  ( IEC = 1110 ) VR AIS
  No Failure IEC=0000

SELF-HEALING NETWORKS USING VIRTUAL RINGS

SUMMARY OF THE INVENTION

This invention relates generally to high speed digital telecommunications systems, to the creation of virtual rings in a network from existing circuits to provide shared protection for network path segments, to expanding the addressing capability of the SONET path overhead to address more nodes in a virtual ring, to distinguishing between network maintenance alarms from external to a virtual ring versus generated within a virtual ring, and to the use of a multi-frame structure to carry more information.

BACKGROUND OF THE INVENTION

The telecommunications network servicing the United States and much of the world is evolving from analog transmission to digital transmission with ever-increasing bandwidth requirements. Fiber optic cable has proved to be a valuable tool of such evolution, replacing copper cable in nearly every application from large trunks to subscriber distribution plant. Fiber-optic cable is capable of carrying much more information than copper wire, with lower attenuation due to the wide bandpass of fiber optic cable.

It has become increasingly important to maintain communications connectivity in the presence of transmission system failures. To this end, various schemes have been implemented to provide automatic protection for failed network segments by temporarily bypassing such failed network segments.

The disruption of telecommunications services in a telephone network is typically caused by an inoperable communications path (link) or terminal equipment within a service providing office (node). Any disruption of such services can be very costly to business users who rely on telecommunications services in the important operation of their businesses. The duration of a service disruption is typically based on a number of factors, such as, for example, (a) the amount of time required to identify the location of the service disruption; (b) the amount of time that is used to identify one or more routes that could be used to provide at alternate route for affected traffic around the service disruption; and (c) the amount of time that is actually needed to establish such alternate routes. In dealing with a service disruption by selecting an alternate route around an inoperable link or service providing node, one goal is to select the most efficient alternate route, one having least number of nodes and links.

In the prior art a number of service restoration arrangements have been implemented to enhance the reliability of telecommunication networks by providing alternate routes established "on the fly" to temporarily replace inoperable network links or service providing nodes. Other prior art provide an established backup alternate route to temporarily replace inoperable network links or service providing nodes. In all these service restoration arrangements failed network links or service providing nodes are temporarily bypassed until the failed equipment or cables are repaired.

In today's self-healing networks, of the types outlined above, four forms of restoration are primarily used: 1) centralized, controller-based, (2) linear protection, (3) path-switched rings (or sub-network connections), and (4) line-switched rings. Because of their speed of restoration, rings tend to be the vehicle of choice. However, rings are not universally deployed for various reasons.

Centralized, controller-based restoration, which takes on the order of thirty seconds to several minutes to restore a faulty circuit, has the advantages of fine granularity and deployment without regard to ring structures. However, these centralized systems are usually coupled to operations systems for failure information, and need to be told when to revert. As the network grows, the controllers become more complex and costly, and are a potential processing bottleneck.

A second type of network protection is a linear arrangement wherein for every primary fiber optic cable in the network that is used to provide service, there is a dedicated, secondary, backup fiber optic cable that provides service in the event there is a fault with the primary cable. A switch over occurs when the signal path in the primary cable, or its terminating equipment, is deemed defective. This is one-hundred percent redundancy which is very expensive. Also, the primary and secondary fibers are typically routed in the same conduit, so a fiber cut likely causes both primary and secondary cables to simultaneously fail. Accordingly, linear protection is not widely used as a network protection scheme for inter-office facilities because of the bandwidth inefficiency and the high probability that both primary and secondary fibers could simultaneously fail.

A third and more commonly used type of network protection utilizes network rings. There are a few types of ring service restoration arrangements. In a first arrangement, called Uni-directional Path Switched Rings (UPSR), telecommunication signals are carried from an originating node to a terminating node through a primary network path comprised of links and intermediate nodes and, at the same time, the signals are carried between the originating and terminating nodes over an alternate ring topology path also comprised of links and intermediate nodes. If there is a failure anywhere in the primary network path or the alternate ring path, there is no loss of signal. This approach is also very expensive and not widely used for inter-office facilities because there is 100 percent redundancy. The primary advantage with this arrangement is there is no need for communications and switching to set up the alternate ring path, because that path is already connected and in use. Therefore, the switch times are on the order of milliseconds. Also, another advantage is that the switching granularity is at the SONET path level, or circuit level. Thus, some of the individual paths within the line can be switched independently based on the health of each signal.

Another type of ring based service restoration, entitled Bi-directional Line Switched Ring (BLSR), utilizes alternate, shared secondary ring bandwidth that is utilized only as needed to provide alternate routes to temporarily replace primary ring traffic due to inoperable network links or service providing nodes. When a fault is detected all primary ring traffic carried on the cable where the fault is detected is switched to the shared secondary alternate ring bandwidth. For example, with reference to FIG. 1, if a failure occurs between nodes E and F, the primary signals within the cable are looped back to node A. The alternate shared secondary bandwidth from node A to node B to Node C to Node D to Node F is utilized to restore the primary ring traffic. The main advantage of BLSR network protection is the shared protection bandwidth. Various primary paths around the ring may utilize the shared protection bandwidth. Therefore, due to the shared protection concept, there are many traffic distribution patterns around the ring that allow much greater bandwidth utilization than path switched rings. The switch times are still on the order of milliseconds, even though the shared protection path needs to be allocated to the appropriate primary signals. A major disadvantage of BLSR is the granularity which is at the SONET line level not circuit level.

Signals carried through fiber-optic cable networks are in accordance with the Synchronous Transport Signal Level (SONET) standard. SONET defines a hierarchy of multiplexing levels and standard protocols which allow efficient use of the wide bandwidth of fiber optic cable, while providing a means to merge lower level DS0 and DS1 signals in a common medium. In essence, SONET establishes a uniform, standardized transmission and signaling scheme which provides a synchronous transmission format that is compatible with all current and anticipated signal hierarchies. The basic SONET signal (STS-1) has a base rate of 51.480 Mb/sec.

The optical equivalent of STS-1 is called Optical Carrier level 1 (OC-1) and is used for transmission across fiber optic cable. The basic STS-1 signal transmission rate can be multiplexed together to form higher signal rates which include STS-3, STS-12, STS-48, STS-192, and beyond. The corresponding optical carrier levels are OC-1, OC-3, OC-12, OC-48, OC-192 and beyond. The STS frame format is composed of 9 rows of 90 columns of 8-bit bytes, for a total of 810 bytes at a 125 microsecond frame rate.

The SONET standard provides a layered operation and its path overhead (administrative) and transport functions are divided into four layers. These layers are the photonic, section, line and path layers. The first three bytes of columns in the SONET STS-1 format are called the transport overhead bytes which include line and section overhead and are used for network maintenance, control and circuit restoration purposes.

The prior art has a BLSR network protection scheme, generally described above, that is at the SONET line layer. Therefore, the switching granularity is at the line layer. Any restoration with this BLSR network protection scheme requires that all paths within the line be restored. Flexibility to switch some of the signals independently from other signals within the line based on the health of the individual signals does not exist. Also, a BLSR network protection scheme must have the same OC-n rate interfaces at all points within the ring in order to function properly.

The BSLR protocol used with SONET utilizes two bytes, a total of sixteen bits, to communicate between nodes in a fiber-optic network. Four of these bits are used to provide a source node identity, four more bits are used to provide a destination node identity, and eight bits are used to carry information between the identified source and destination nodes. With only a four bit address being used for source and destination node addresses, only a maximum of sixteen source and sixteen destination node addresses may be specified. Therefore, there can be no more than sixteen nodes in a Bi-directional Line Switched Ring (BLSR). This is a limitation when ring based circuit restoration is used for a SONET line layer.

The SONET standard also provides for maintenance requirements of the SONET system, including failure detection and reporting using Alarm Indication Signals (AIS). These include failure states of Loss of Signal, Loss of Frame, and Loss of Pointer. There are also other defined AIS signals than those listed in the last sentence. Detection of a failure requires that an AIS signal be generated. The particular AIS signal which is generated depends upon the failure and upon the type of equipment generating the signal. A Line AIS signal is generated by section terminating equipment to alert downstream line terminating equipment that a failure has been detected, while line terminating equipment generates Path AIS. A Path AIS signal is to be generated within 125 microseconds after detection of the failure.

The SONET Line Alarm Indication Signal (L-AIS) indicates to downstream line termination equipment that a signal fail condition of some type has been detected upstream, and further alarms downstream are not required. This is useful in determining where in a line a failure has occurred.

With the SONET standard and the existing ring protocols, it is not possible to create shared protection rings on a portion of a SONET path or a path segment. Creating this type of ring on a path segment basis would allow the most flexibility for network providers to allocate and protect bandwidth. Currently, rings on a path segment basis have the problem of not being able to distinguish failure conditions, such as AIS, caused externally or internally to the path segment based ring. Therefore, the protection ring would provide network protection even though there is no fault in the ring This is one example why path segment based rings are not possible using current approaches.

Thus, in the prior art there is a need for a more efficient ring arrangement to provide protection to service networks without the shortcomings of prior art rings, which are: (a) requiring all interfaces within shared protection based ring to have the same OC-N interface, (b) limiting the granularity of shared protection based rings to the Line Layer, (c) not allowing shared protection based rings to operate on a path segment basis, and (e) the performance bottlenecks of a centralized restoration scheme.

In meeting the above described needs it would be desirable to have restoration based on sub-network connection principles with shared rather than dedicated protection. This protection should, if possible, be granular down to the circuit or path level. Also, the protection should be distributed and autonomous, triggering without information from operating systems and reverting automatically when a fault is cleared. Restoration speed should be in the order of milliseconds. All these are provided with the present invention.

SUMMARY OF THE INVENTION

The above described needs in the prior art are satisfied by the present invention. Our invention provides: (a) the ability to have interfaces between different rings that do not have the same OC-N interface, (b) a finer granularity of shared protection based rings to the Path Layer so network providers can allocate bandwidth in a more efficient way, (c) allowing shared protection based rings to be defined on a path segment basis, (d) increasing bandwidth efficiency by using shared protection based rings, and (e) using autonomous, distributed protection rings that automatically and quickly restore service without the need for a centralized controller.

Our invention uses the concept of a virtual ring at the circuit level in a network by designating protection rings independent of general network architecture or the nature of particular network elements. A virtual ring can then be partitioned into sections of working circuits assigned to so-called working path segments of the ring and sections of protection circuits assigned to so-called protection path segments. The protection is enabled via a new virtual ring (VR) embedded signaling protocol at the circuit level. Amongst other improvements, the new VR protocol provides the ability to distinguish between failures incoming to the ring and failures on the path segment based ring. In addition, the new VR protocol is not propagated outside the ring and has no impact on the rest of the network. Thus, the invention can be implemented within a SONET network. Further, a virtual ring utilizing the present invention can be established in a network alongside other prior art rings or within a UPSR. Also, the BLSR protocol adopted for shared, bi-directional protection line switched rings can be modified and applied to the virtual rings. Since the invention allows originating and terminating node address information for the new virtual rings (VR) to be carried in a protocol using a greater number of address bits than used in the prior art, the protocol can be adapted to establish rings having a larger number of ring nodes in each virtual ring.

Virtual rings are distributed across many network elements throughout a network. The interfaces on the network element can be a mixture of any SONET interface rate. The shared protection capability of the virtual ring is utilized when a specific network segment is determined to be defective for some reason. Restoring the primary traffic by rerouting it to the shared protection bandwidth of the virtual ring can be implemented very fast because a central controller is not utilized. This form of shared protection is also more predictable than controller based restoration schemes because it is known with certainty what protection path segments will be preempted to provide network restoration when any particular service path segment is determined to defective. In contrast, network protection schemes utilizing a central controller create are typically slower.

Our novel virtual ring structure can be viewed as a BSLR protection scheme for sub-path entity or path segments within a network. Path segments are a portion of a SONET end-to-end path. Virtual rings can be viewed as a grouping of path segments with a network into a ring structure.

Adapting the BLSR scheme to a path segment level requires two major hardware functions. The first function is an in-band communications channel to transport the new virtual ring (VR) protocol which allows for different network elements within the virtual ring to coordinate the use of the shared protection bandwidth. The second function is the ability to identify a path segment between adjacent nodes. Identification of a path segment is necessary, since only the path segment portion of the path is being protected by the virtual ring. Identifying the path segment also allows for the determination of errors within a virtual ring versus external to the virtual ring and allows for determining the health of the path segment (i.e., number of bit errors on the path segment). Because virtual rings are based on path segments, not the SONET line, both of these hardware functions need to in the Path Overhead (POH), rather than the Line Overhead (LOH), in order that they can pass through intermediate line terminating nodes in the ring to a destination node which may be located several nodes distant.

To provide circuit protection in a network in the most advantageous manner, protection segments of the virtual rings are utilized as needed using existing, low priority, or currently available, service circuit segments to provide backup protection to higher priority path segments in a network. Thus, no dedicated network segments need to be provided to provide automatic protection switching to the network.

When setting up a virtual ring in a network by interconnecting path segments, the number of nodes that are involved in the ring could become quite large. Therefore, a larger number of node addresses are needed than may be addressed using the existing SONET BSLR protocol standard. In accordance with the teaching of the present invention, unused bytes in the Path Overhead (POH) layer of SONET, coupled with multiframe addressing over eight SONET frames, instead of one frame, permit increasing the number of nodes that may be addressed in a ring while still utilizing the BLSR protocol. The number of nodes in a virtual ring can be up to 64 nodes. This is provided by allowing up to 6 bits for a source node identifier and 6 bits for a destination node identifier.

Bits in an unused byte in the POH layer are utilized to: (a) expand the number of nodes that can comprise a virtual ring, (b) indicate the beginning and end of a path segment, (c) carry an Incoming Error Count from the source point of the virtual ring, and (d) provide a virtual ring Automatic Protection Switching (APS) channel for communicating protection switching information between the switching points in the virtual ring.

When a fault occurs on one of the path segments or nodes within our novel virtual ring, APS switching is allowed to occur by detecting that the fault is within the virtual ring and not external to the ring. This is provided by the bits in the POH identifying the source and destination points of the virtual ring. When a fault is external to the virtual ring (VR), automatic protection switching is not allowed to occur within the VR. This increases efficiency of use in the network.

DESCRIPTION OF THE DRAWING

The invention will be better understood upon reading the following Detailed Description in conjunction with the drawing in which:

FIG. 3 shows how bits in the Z3 or Z4 byte in the Path Overhead are mapped into the Incoming Error Count field and the Automatic Protection Switching Field;

FIG. 4 shows a twenty four bit message created using the multiframe and the information carried therein;

DETAILED DESCRIPTION

To implement the present invention there are two requirements. The first is an in-band channel to transport a new, expanded Virtual Ring (VR) Automatic Protection Switching (APS) protocol, and the second is the ability to identify path segments and determine errors within a path segment. Both of these functions need to reside in the Path Overhead (POH) layer of SONET, rather than the Line Overhead (LOH) layer, in order that they can pass through intermediate nodes, which are Line Terminating Network Elements to a destination node in the virtual ring.

The new VR APS protocol is derived from the BLSR APS protocol, but extends the source and destination address fields such that a greater number of nodes can be present on the virtual ring. Since the VR APS protocol is part of the POH, it is independent of the BLSR APS protocol which is part of the LOH. Since these protocols are at different layers in the SONET hierarchy, it is possible to allow a path segment of a virtual ring to pass through a BLSR ring. The BLSR ring will pass through the VR APS protocol.

To provide addressing for many more nodes in a virtual ring, additional addressing bits are needed. In accordance with the preferred embodiment of the invention, bits of one unused SONET POH byte, either Z3 or Z4, is used in conjunction with multiframe operation for this purpose. This is done as not to take all unused bytes in the SONET POH signaling structure. To indicate to the network service provider which of the Z3 or Z4 bytes is to be utilized, there is a selection control between the Z3 and Z4 byte as part of the virtual ring network elements that is used to select the Z3 or the Z4 byte for virtual ring processing. Throughout the remainder of this Detailed Description it will be assumed that the Z3 byte has been selected to implement the present invention so only this byte will be referred to.

The unused Z3 byte in the SONET POH layer is used, in conjunction with multiframe operation to expand the number of nodes that can be addressed and to carry more information. In this manner compatibility is maintained with the existing SONET standard and BLSR protocol being used in the remainder of the network. Bytes in the SONET POH overhead are used so that addressing and other information carried in the Z3 byte may pass through intermediate nodes in our new virtual ring to the terminating node.

At the VR destination node all information in the Z3 byte is removed, written over with all zeroes or ones per the SONET standard for the unused byte, the B3 byte is compensated due to the Z3 byte contents changing and there is, accordingly, reversion to standard uniframe SONET operation before exiting the virtual ring.

Figure 1:
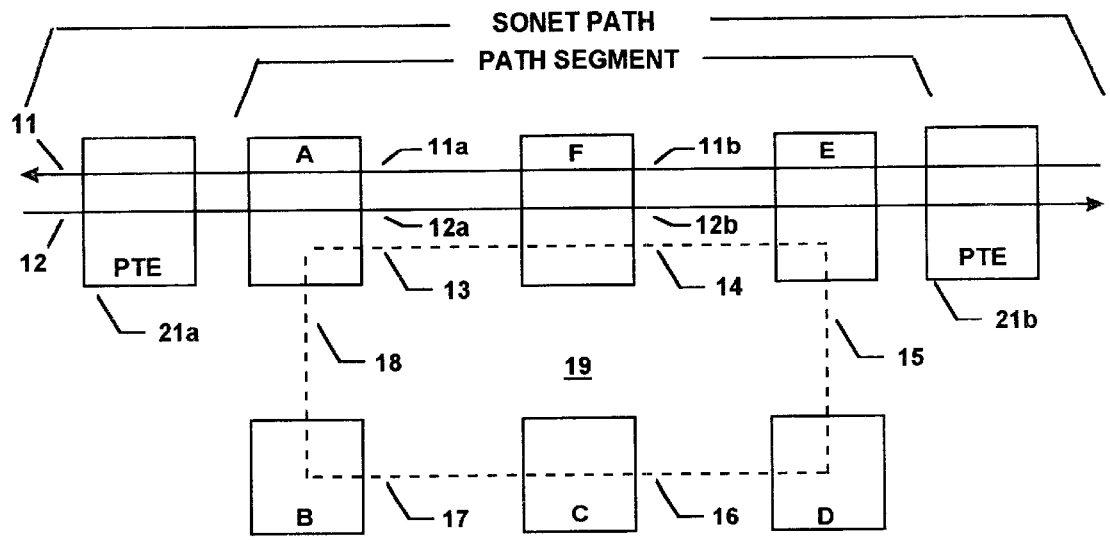
FIG. 1 shows a network view of a virtual ring, which is comprised of 6 nodes, carrying service circuits with no network defects occurring.

In FIG. 1 is shown a block diagram of a portion of a bi-directional network as represented by paths 11 and 12. Network paths 11 and 12 pass through three nodes A, F and E. All nodes in the figure represent LTEs (Line Termination Elements). A SONET line is defined as the link between any two LTEs, such as the SONET line 13 between nodes A and F, or line 14 between nodes F and E. A SONET path is the link between two PTEs (Path Termination Elements), which includes one or more SONET lines. A path segment, which is part of the invention, is defined as a portion of SONET path. A path segment includes a portion or all of the SONET or, alternatively, multiple SONET lines. See Bellcore document GR-253-CORE, entitled "Synchronous Optical Network (SONET) Transport System: Common Generic Criteria", for more information on SONET Paths and Lines. A SONET path segment is marked on FIG. 1 as including line segments 13 and 14, and nodes A, F and E.

In accordance with the teaching of the present invention, SONET lines 13 through 18 in FIG. 1 comprise service circuits that are used to handle telephony communications between the nodes to which they are connected when they are not automatic protection switched to implement virtual ring 19 or, alternatively, SONET lines 15 through 18 can comprise unused circuits.

Bi-directional network connections 11 and 12 have restoration paths provided therefore in the form of virtual ring 19. When a network element controller within node A (not shown, but well known in the art) detects a fault in either SONET lines 11 or 12, including in the termination equipment (LTE) associated with these two line segments, it implements a virtual ring network restoration procedure to restore service to the network in a matter of microseconds. The network element controller within node A locates the protection circuits which comprise virtual ring 19 and switches the route from the failed network connections 11a, 11b, 12a and/or 12b to the shared protection bandwidth of the virtual ring.

Figure 2:
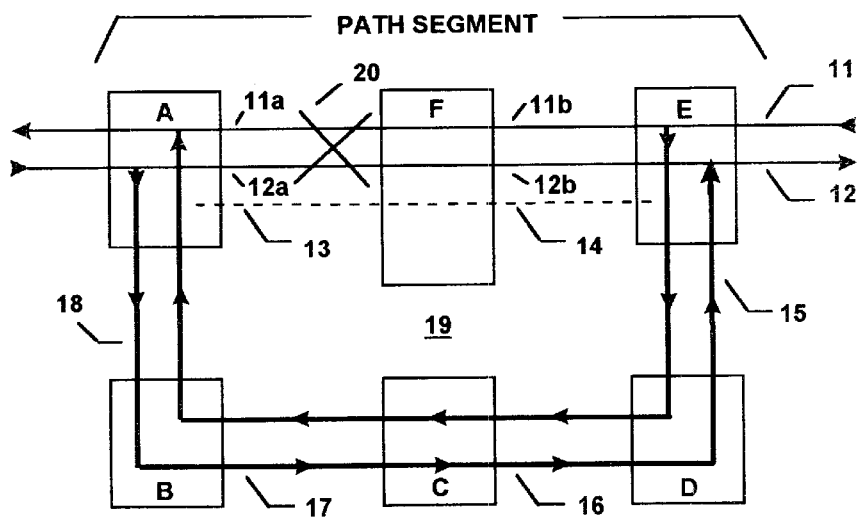
FIG. 2 shows a network view of a virtual ring with protection switching occurring in accordance with the present invention.

This operation is shown in FIG. 2. In that Figure, when line 12a is determined to be defective by the network element controller (not shown) in node A, automatic protection switching to the shared protection bandwidth of virtual ring 19 takes place in microseconds. The defective line 12a is bypassed as follows. The signals are re-routed via nodes B, C and D to node E where the signal is inserted at the virtual ring destination node E into the outgoing network connection 12. This virtual ring 19 path is shown as the dark, solid line with multiple arrowheads along it in FIG. 2 between nodes A and E. Since a bi-directional cable cut is shown on FIG. 2, the network element controller in node E detects defective line segment 11a. Node E re-routes network connection 11 along virtual ring 19 in the opposite direction to node A, also shown as a dark line in FIG. 2.

Network element controllers in node A and E detect an AIS defect which is generated due to the cable cut. This AIS indication is used to determine that the failure being detected is within virtual ring 19 and therefore a restoration to the shared protection bandwidth of the virtual ring should occur.

Figure 10:
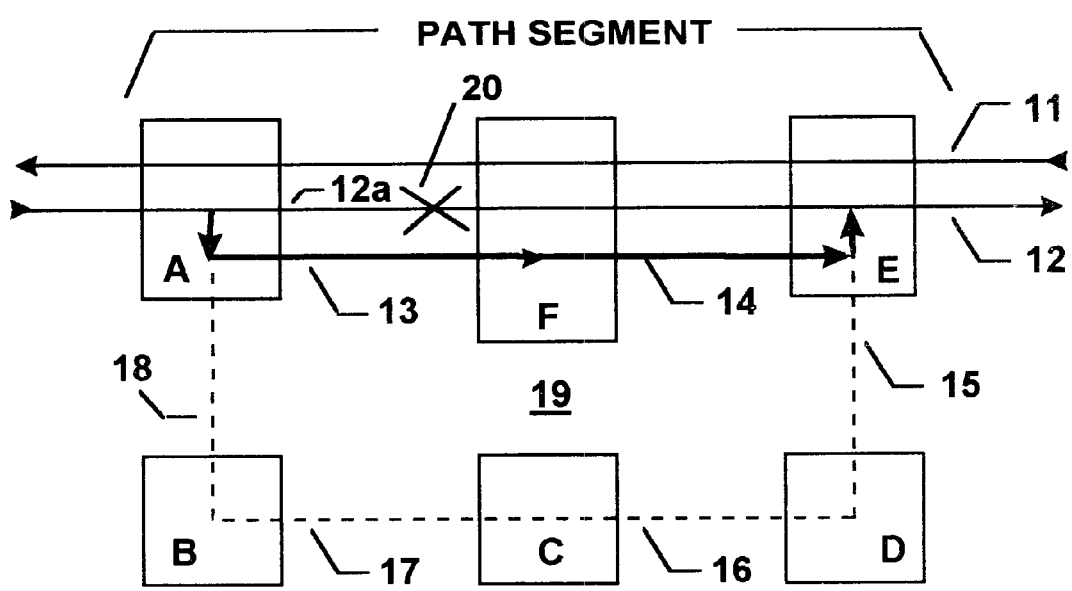
FIG. 10 shows a virtual ring that is comprised of three nodes where the service path segments traverse the same network elements as the protection path segments of the virtual ring.

In an alternative embodiment of the invention shown in FIG. 10, in the fiber cable of line 12a, a fault 20 may only involve a single fiber strand within the cable or circuits within the fiber, rather than the entire fiber optic cable (such as a cut cable). Rather than bypass the entire fiber cable 12a between nodes A and F, as shown in FIG. 2, another strand in the same fiber cable or channels with the fiber of line 12a may be utilized to bypass the defective strand. Using the teaching of the invention taught herein, the VR APS signaling is used to communicate around the VR to allow switching to an unused fiber in cable 12a in order to bypass the defective fiber in line 12a.

In accordance with the teaching of the present invention, which utilizes the Bi-directional Line Switch Ring (BLSR) protocol with SONET, bits of either the unused Z3 or Z4 byte in the Path Overhead (POH) layer of SONET are utilized to permit addressing up to sixty-four nodes in one ring. This is a four hundred percent increase in the number of nodes that may be addressed over the prior art SONET standard. The particular one of the Z3 or Z4 bytes that is utilized is selected by the network provider and programmed into all network elements that comprise the virtual ring. The selected Z- byte is only used internal to this network, and never outside. Both the Z3 and Z4 bytes are not used in order to leave an unused byte available for future growth of the SONET protocol. A multiframe operation is used in conjunction with the selected one of the Z3 or Z4 bytes to implement the invention. Throughout the remainder of this detailed description, reference is only made to POH byte Z3 for the sake of simplicity, but it should be understood that byte Z4 may alternatively be utilized instead.

Figure 5:
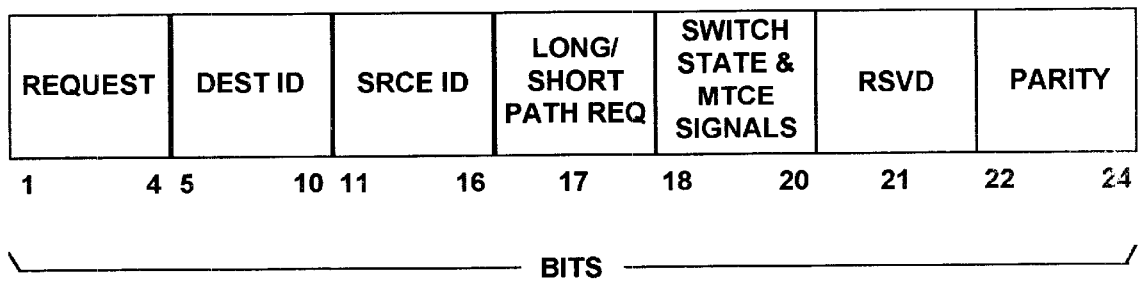
FIG. 5 shows how the twenty-four bit message is mapped into the various fields within APS message.

The eight bits of the Z3 byte in the Path Overhead (POH) are used to implement a new Virtual Ring Alarm Indication Signal (VR AIS) that is shown in FIGS. 3, 4 and 5. The VR AIS maintenance signal is defined as a valid pointer with an all 1's coding in all of the SPE except for the B3 and Z3 bytes. The Z3 byte carries the VR APS message and the Incoming Error Code (IEC), while the B3 byte is compensated, so it reflects the correct parity for the SPE.

In any virtual ring (VR) there are a source node (A), a destination node (E), and intermediate nodes (B, C, D and F) such as shown in FIGS. 1 and 2. The number of intermediate nodes can vary. While signals pass in both directions through a network, the source node A is arbitrarily chosen to be the node where signals passing left to right enter the VR, and the destination node is arbitrarily chosen to be the node where signals passing left to right leave the VR.

In accordance with the teaching of the present invention, and as shown in FIG. 3, the four lower order bits B0 to B3 of the Z3 byte, designated APS-1 to APS-4 (Virtual Ring Automatic Protection Switching) are used to provide a communications channel between network elements in the virtual ring. The communications channel carries a 'BLSR like' protocol with expansion capability to 64 nodes that is implemented by the present invention. The four higher order bits B4 to B7, designated IEC-1 to IEC-4 (Incoming Error Count), are used to keep track of parity error counts coming into node A from external to ring 19 (FIGS. 1 and 2) so that Automatic Protection Switching is not invoked to create the new path within virtual ring 19, except when a fault is detected within the nodes (A–F) and line segments (13–18) of ring 19. The IEC-bits (B4–B7) of the POH Z3 byte shown in FIG. 3 identify incoming failures to the virtual ring (VR) path segment versus failures occurring within the VR path segment. Identifying incoming failures is done by using one of the 16 possible binary codes carried in the IEC field. For example, incoming path AIS at a virtual ring source point is mapped to 1110. Also, incoming line defects and path defects cause the IEC field to be set to 1110.

Referring to FIGS. 3, 4, and 5, the APS-bits in bits B0 through B3 of the Z3 byte (FIG. 3) over eight consecutive frames are mapped into the multiframe as shown in FIG. 4. In FIG. 4 are shown eight rows designated Frame 1 to Frame 8. Each of these eight rows has four bits, creating columns, which are designated bits 0 to 3. Bit 0 (APS-1) in FIG. 3 is bit 0 (far right column) in each of the eight rows designated Frames 1 to 8, bit 1 (APS-2) in FIG. 3 is bit 1 (next to far right column) in each of the eight rows designated Frames 1 to 8, bit 2 (APS-2) in FIG. 3 is bit 2 in each of the eight rows Frames 1 to 8, and bit 3 (APS-2) in FIG. 3 is bit 3 in each of the eight rows designated Frames 1 to 8.

First, a framing bit is needed with each of the eight frames (F1–F8) of the multiframe shown in FIG. 3. In one example, the total eight bit framing byte number of 1000 000 is made up of one digit of this binary number in bit 3 of each of the eight frames F1–F8. These come from bit B3 in FIG. 3 over eight successive Z3 bytes. Thus, F1, bit 3=1 and F2 through F8, bit 3=0. A framing algorithm is used by the receiver to lock onto this pattern, and therefore, find the multiframe boundary. After the boundary is located, the receiver can retrieve the 24 bit message contained in bits B0–B2 of Frames 1–8.

In the remainder of the eight byte (four bit) multiframe in FIG. 3 we have the following. The first bit (B0) of the first of eight successive Z3 bytes in FIG. 3, is stored in the bit block numbered 1 of Frame 1 in FIG. 3. The first bit (B0) of the second of the eight successive Z3 bytes in FIG. 2, is stored in the bit block numbered 4 of Frame 2 in FIG. 4. The first bit (B0) of the third of the eight successive Z3 bytes in FIG. 4, is stored in the bit block numbered 7 of Frame 3 in FIG. 4. The first bit (B0) of the fourth of the eight successive Z3 bytes in FIG. 3, is stored in the bit block numbered 10 of Frame 4 in FIG. 4. Likewise, the first bit B0 of the fifth through eighth successive Z3 bytes are stored in blocks 13, 16, 19 and 22 of Frames 5–8 in FIG. 4. The same pattern repeats for a cross mapping of the B1–B3 bits of eight successive Z3 bytes of FIG. 3 into the multiframe in FIG. 4 as follows:

TABLE 1

| Z3 Byte | Z3 Bit | Frame 1–8 Bit block |
| --- | --- | --- |
| 1 | 0 | 1 |
| 1 | 1 | 2 |
| 1 | 2 | 3 |
| 1 | 3 | F1 |
| 2 | 0 | 4 |
| 2 | 1 | 5 |
| 2 | 2 | 6 |
| 2 | 3 | F2 |
| 3 | 0 | 7 |
| 3 | 1 | 8 |
| 3 | 2 | 9 |
| 3 | 3 | F3 |
| 4 | 0 | 10 |
| 4 | 1 | 11 |
| 4 | 2 | 12 |
| 4 | 3 | F4 |
| 5 | 0 | 13 |
| 5 | 1 | 14 |
| 5 | 2 | 15 |
| 5 | 3 | F5 |
| 6 | 0 | 16 |
| 6 | 1 | 17 |
| 6 | 2 | 18 |
| 6 | 3 | F6 |
| 7 | 0 | 19 |
| 7 | 1 | 20 |
| 7 | 2 | 21 |
| 7 | 3 | F7 |
| 8 | 0 | 22 |
| 8 | 1 | 23 |
| 8 | 2 | 24 |
| 8 | 3 | F8 |

With this multiframe operation over eight successive Z3 bytes, excluding the framing bits F1 to F8 in FIG. 4, there are a total of twenty-four bits (numbered 1–24) in FIG. 4 in which addresses and data can be stored. This is a big increase from the four bits (B0–B3) of one Z3 byte as shown in FIG. 3.

The twenty-four bits (numbered 1–24) of the multiframe message shown in FIG. 4 in which addresses, data and parity information are stored is shown in FIG. 5. Bits 1–4 specifying requests. Bits 5–10 provide addressing for sixty-four destination nodes in the virtual ring in accordance with teaching of our invention. Bits 11–16 provide addressing our source nodes in the virtual ring. Bit 17 indicates a short path request or a request. Bits 18–20 are a field specifying maintenance signals or states of the ring switching protocol (see Bellcore GR-1230). Bit 21 is reserved for future use, and bits 22–24 are parity bits.

The requests carried in bits 1–4 and 18–20 of the twenty-four bit multiframe message in FIG. 5 are well known in the SONET art and are described in detail in Bellcore document GR-1230-CORE, Issue 2, November 1995, entitled "SONET Bidirectional Line—Switched Ring Equipment—Generic Criteria". These messages are standard APS messages used in BLSR and are carried in the VR APS bits of byte Z3

Only the four bits B0–B3 of each Z3 byte of Frames 1–8 of the multiframe shown in FIG. 3 have been described thus far. Bits B4–B7 of the Z3 byte carry the Incoming Error Count (IEC) over the SPE from the previous frame. No multiframing is necessary. Bits B4–B7 store the parity error count incoming to node A of ring 19 from the left as shown in FIG. 2. In the prior art parity errors accumulate along the entire SONET path. As described previously, in the prior art a high parity error count could not be broken, on a per frame basis, into a path segment error count and an error count outside of the path segment. Therefore, with the present invention, if the high error rate is due to defects outside of the path segment shown in FIG. 1, virtual ring 19 will not be switched in (see FIG. 1). With our invention, at the VR source point (node A), the incoming parity error count is stored in bits B4–B7, designated IEC-1 to IEC-4 (Incoming Error Count) in byte Z3, as shown in FIG. 2. In this manner they can be forwarded from VR source node A to VR destination node E. At Node E the incoming parity error count is subtracted from the overall B3 parity measured at node E. The result is the actual error count that is associated with the path segment shown in FIG. 1. The path segment error count is used as a trigger for protection switching of the service virtual ring (VR) traffic to the protection bandwidth of virtual ring 19.

Incoming IEC errors are placed in bits 4–7 (IEC-1 to IEC-4) of the Z3 byte as shown in Table 2. Since the Z3 byte is in the Path Overhead (POH) layer, the byte can be forwarded from VR source node A, through any number of intermediate nodes B, C and D, to VR node in FIG. 1. At VR destination node E, the EC is removed and laced into the field. This operation is described below.

TABLE 2

| Number of Incoming B3 Errors In IEC Field | Z3 Bit | | | |
|---|---|---|---|---|
| | B7 | B6 | B5 | B4 |
| 0 | 1 | 0 | 0 | 1 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| Incoming AIS | 1 | 1 | 1 | 0 |

At VR destination node E the number of parity errors occurring in the VR must be determined. It is derived by taking the total number of B3 errors at the VR destination node and substracting the number of B3 errors mapped into bits B4–B7 (IEC 1–4) of the Z3 byte. The interpretation of the IEC coding is shown in Table 3 immediately below, and the absolute value of this difference is the number of parity errors in the VR path segment between nodes A and E in FIGS. 1 and 5.

TABLE 3

| IEC Code Interpretation | Z3 POH Bytes | | | |
|---|---|---|---|---|
| (in BIP violations) | B7 | B6 | B5 | B4 |
| 0 | 0 | 0 | 0 | 0 |
| 1 | 0 | 0 | 0 | 1 |
| 2 | 0 | 0 | 1 | 0 |

TABLE 3-continued

| IEC Code Interpretation | Z3 POH Bytes | | | |
|---|---|---|---|---|
| (in BIP violations) | B7 | B6 | B5 | B4 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |

While passing through the VR the B3 byte in the POH must be compensated to take into account the new information carried in the Z3 byte. This compensation is calculated using the following equation wherein (+) denotes an Exclusive OR function.

$$B3o(t)=B3i(t)(+)VRo(t-1)(+)VRi(t-1)(+)B3o(t-1)(+)B3i(t-1)$$

In this equation the definition of the terms is:

$B3o(t)$ is the outgoing B3 value for frame (t)

$B3o(t-1)$ is the outgoing B3 value for frame (t-1)

$B3i(t)$ is the incoming B3 value for frame (t)

$B3i(t-1)$ is the incoming B3 value for frame (t-1)

$VRo(t-1)$ is the outgoing VR byte value for frame (t-1)

$VRo(t-1)$ is the incoming VR byte value for frame (t-1)

Path segment source and destination nodes need to be identified for each direction of the bi-directional connection. In FIG. 1, for signals coming from the left the source node is node A and the destination node is node E. For signals coming from the right the source node is node E and the destination node is node A.

Figure 6:
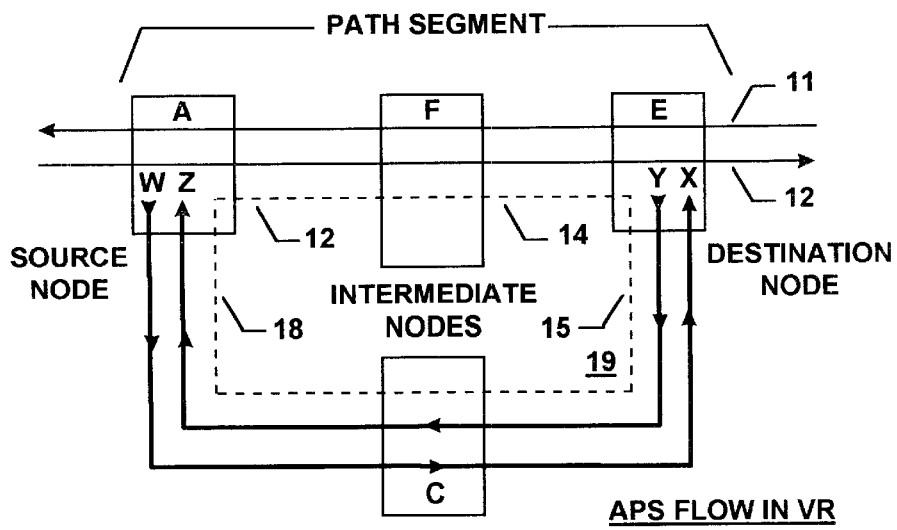
FIG. 6 shows the VR APS message flow in the virtual ring with a virtual ring incoming node, a virtual ring destination node, and intermediate nodes.

In FIG. 6 is shown the flow of VR APS messages in the virtual ring between the source node and destination nodes. VR APS messages being sent from source node A to destination node E are inserted at W in node A and pass through any intermediate nodes, such as node C, in the virtual ring to destination node E. These messages are received at X in destination node E. VR APS messages being sent from destination node E to source node A are insert at Y in destination node E and pass through any intermediate nodes, such as node C, in the virtual ring to source node A. These messages are received at Z in source node A.

Figure 7:
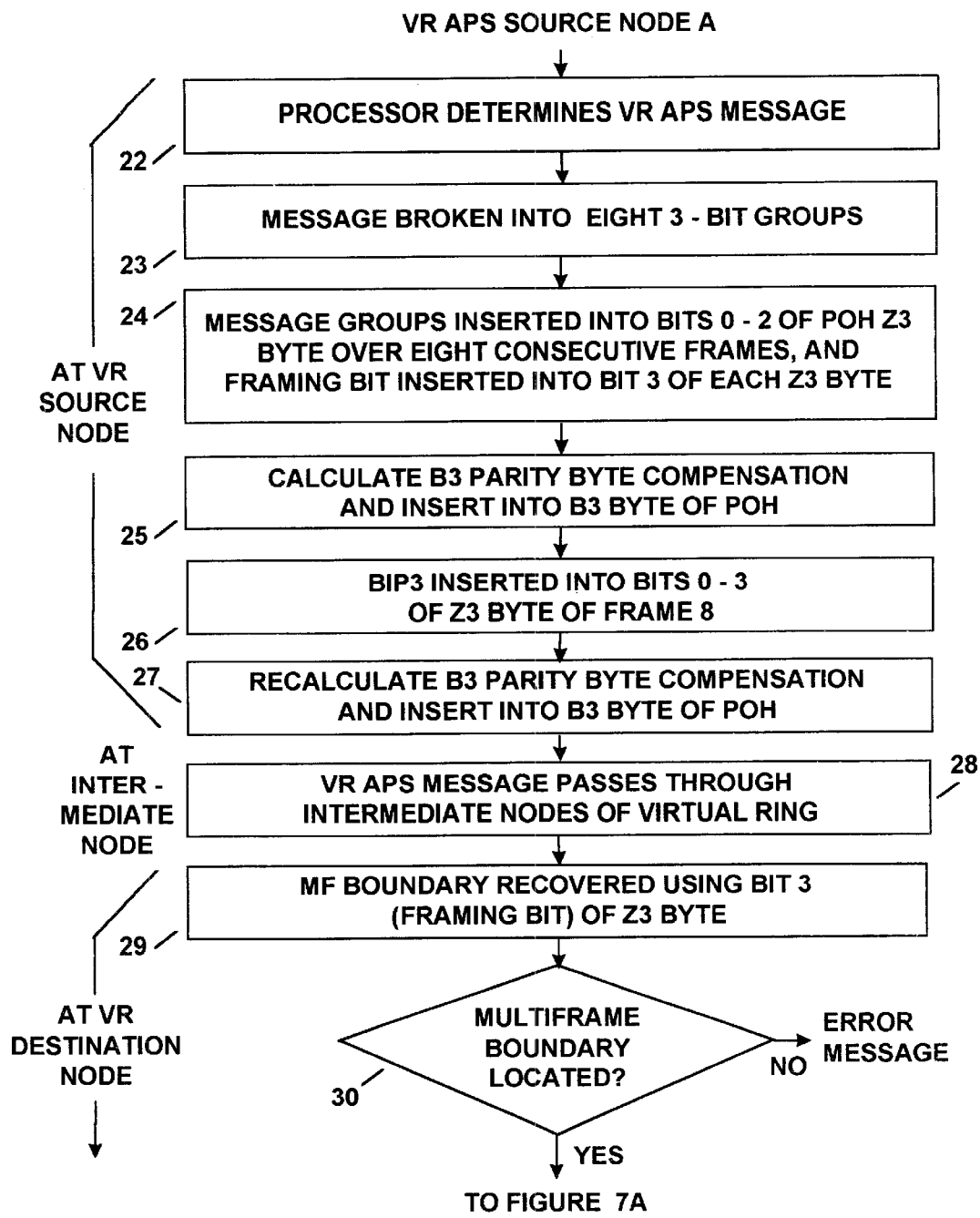
FIGS. 7 and 7A are a flow chart showing the steps involved in creation and use of the multiframe message to carry Automatic Protection Switching addresses.
Figure 9:
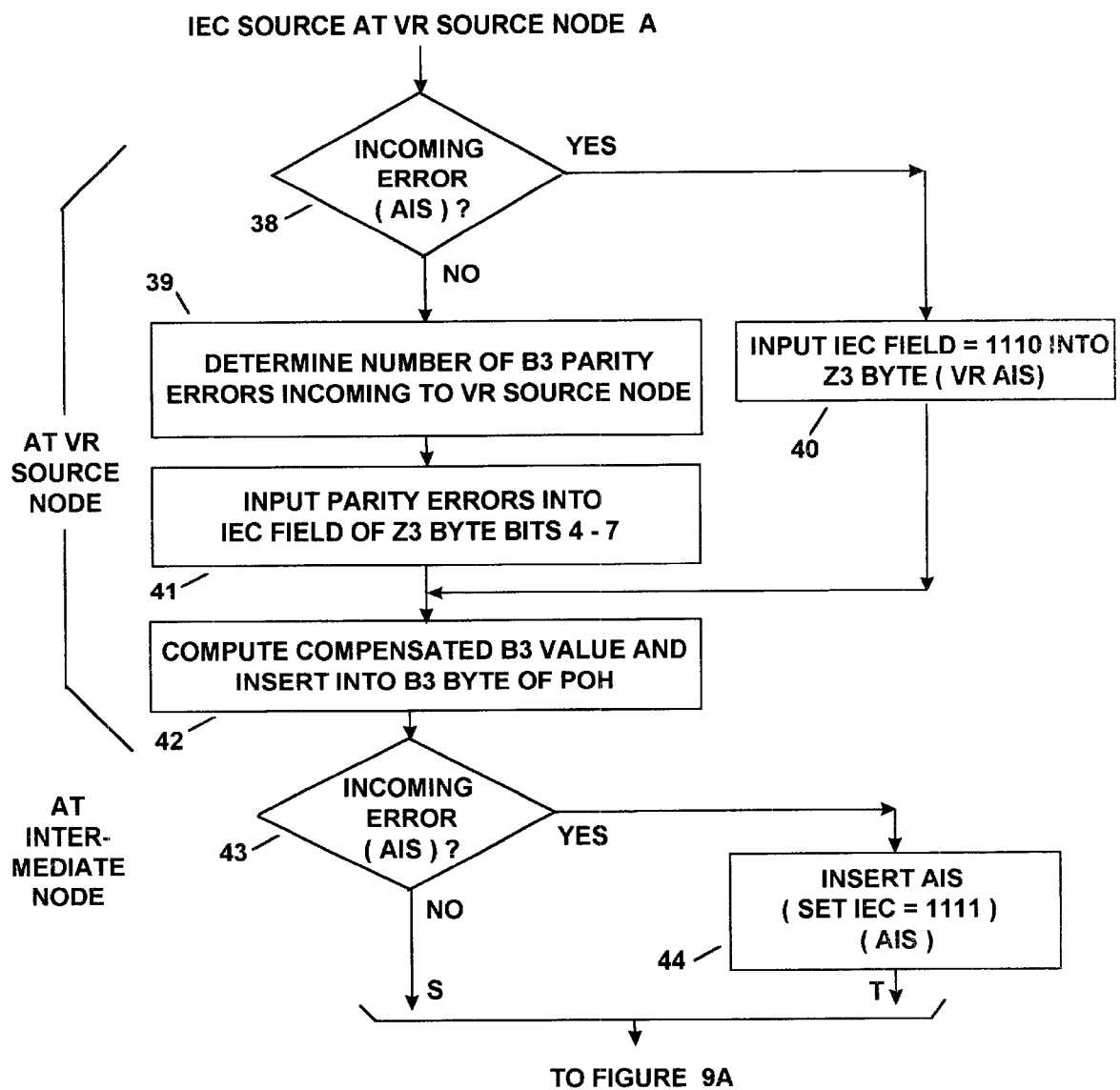
FIGS. 9 and 9A are a flow chart showing the steps involved in handling internal error counts and failures internal and external to the virtual ring in accordance with the present invention.

Turning now to describe the steps involved in setting up a virtual ring (VR) with reference to the flow charts in FIGS. 7 and 9.

Figure 7A:
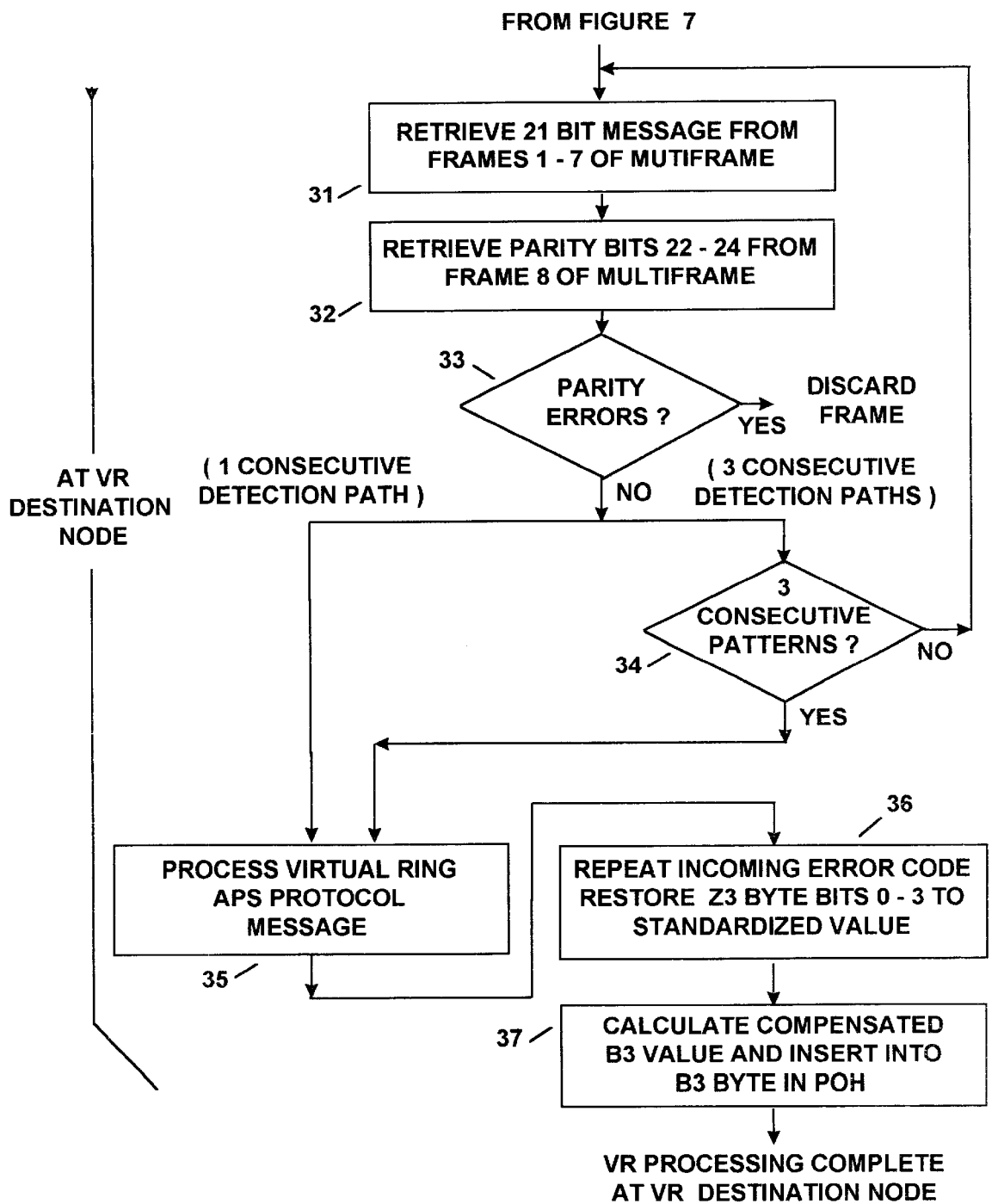

The flow chart in FIGS. 7 and 7A shows the steps involved in implementing the new VR APS operation. First, at block 22, the system processor determines if there are faults that will result any VR Automatic Protection Switching (APS), and exactly where the fault is. From this the processor determines a twenty-four bit VR APS message(s) that must be sent from the source virtual ring (VR) A node to particular nodes in the VR to implement APS that will bypass a faulty line segment. At block 23 the VR APS message generated is divided into eight, three bit groups for transmission via the Z3 POH byte using the previously described multiframe operation to nodes where APS in the VR must be accomplished to bypass a faulty line segment.

These eight, three bit groups making up the VR APS message are then inserted into bits 0–2 of eight consecutive Z3 bytes of the POH at block 24. At the same time a framing bit is inserted into bit 3 of the eight consecutive Z3 bytes of the POH. In block 25 compensation for the B3 parity byte is calculated to compensate for the information in the Z3 POH byte, and the compensated information is written into the B3 byte of the POH for transmission to the VR destination node.

At block 26 the BIP3 information is written into bits 0–3 of the B3 POH byte. In block 27 compensation for the B3 parity byte is recalculated to compensate for the above described BIP3 information in the Z3 POH byte, and the compensated information is written into the B3 byte of the POH for transmission to the VR destination node. This information, along with information previously described and other standard information known in the SONET art are sent via intermediate VR nodes to a destination node as indicated at block 28.

At the destination node E, as indicated at block 29, each part of the boundary of the multiframe is attempted to be detected by the framing bit in bit 3 of each Z3 byte of the POH. The framing bit is described with reference to FIG. 4. Then, at block 30 a check is made to determine if the multiframe boundary has been detected. If not, an error message is generated.

If the multiframe boundary has been detected, the process moves to the next step, shown in FIG. 7A, in which the twenty-one information bits in bits 0–2, frames 1–7 of eight over consecutive Z3 bytes (FIG. 3) are retrieved at block 31 and assembled into the twenty-one bit multiframe word shown in FIG. 5. The parity bits stored in bits 22–24 of frame 8 of the multiframe are retrieved at block 32 and used to check the twenty-one bit multiframe message for parity errors at block 33. If there are parity errors the multiframe is discarded and must be received and assembled again. If there are no parity errors, two detection schemes are utilized. First (three consecutive detection path scheme), at block 34 the multiframe message is checked over three consecutive receptions thereof to make sure they are all identical. If three identical messages are not received as determined at block 34, the program cycles back to block 31 to re-retrieve message and parity bits as just described. When three identical messages are received as determined at block 34, the program progresses to block 35 where the VR APS message in the multiframe message is processed to perform whatever actions are specified therein. Second (one consecutive detection scheme), the first occurrence of a valid multiframe pattern with no parity errors is valid from block 33 is accepted. The program progresses to block 35 where the VR APS message in the multiframe message is processed to perform whatever actions are specified therein. First, at block 35 the APS protocol message in bits 1–8 of the multiframe message are acted upon using the source and destination addresses in bits 9–14 and 15–20 (FIG. 4) to set up a virtual ring to bypass a defective line segment between two nodes. Furthermore, at block 36, the outgoing B0–B3 bits in the Z3 byte of the POH are restored to their standardized value of all zeroes or ones. Finally, at block 37, the compensated B3 value is calculated and inserted into the B3 byte of the POH. At this point all VR processing is completed at the destination node. The network provider must investigate the problem that caused the VR to switch the service traffic to the shared protection bandwidth and, upon correcting that problem, the VR protection bandwidth is switched back to the service path segment and the network path is restored to it s original routing.

Figure 8:
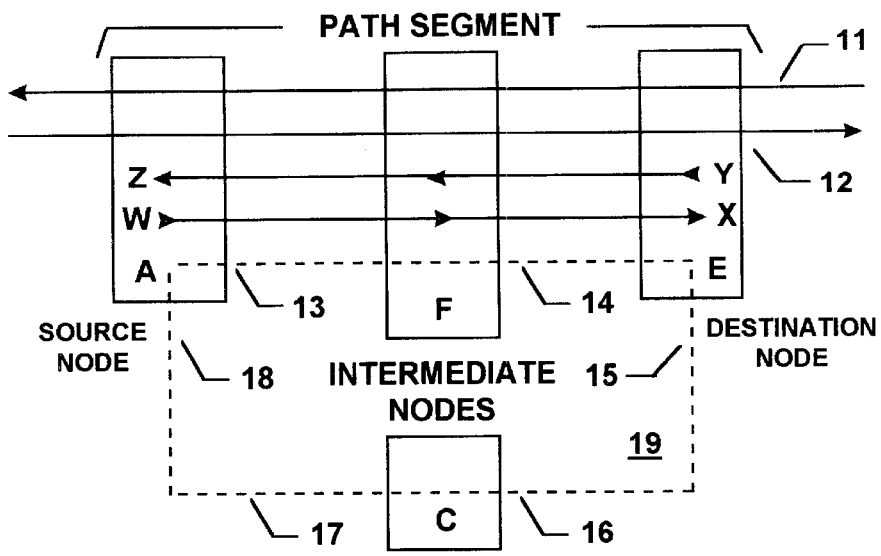
FIG. 8 shows the IEC flow in the virtual ring with no network defects occurring.

In FIG. 8 is shown the flow of IEC nibbles between the source node A and destination node E when no network defects within the virtual ring are occurring. An IEC nibble being sent from source node A to destination node E is inserted at W in node A and pass through any intermediate nodes, such as node F, to destination node E. This IEC nibble is received at X in destination node E. An IEC nibble being sent from destination node E to source node A are insert at Y in destination node E and pass through any intermediate nodes, such as node F, to source node A. These IEC nibbles are received at Z in source node A.

Figure 8A:
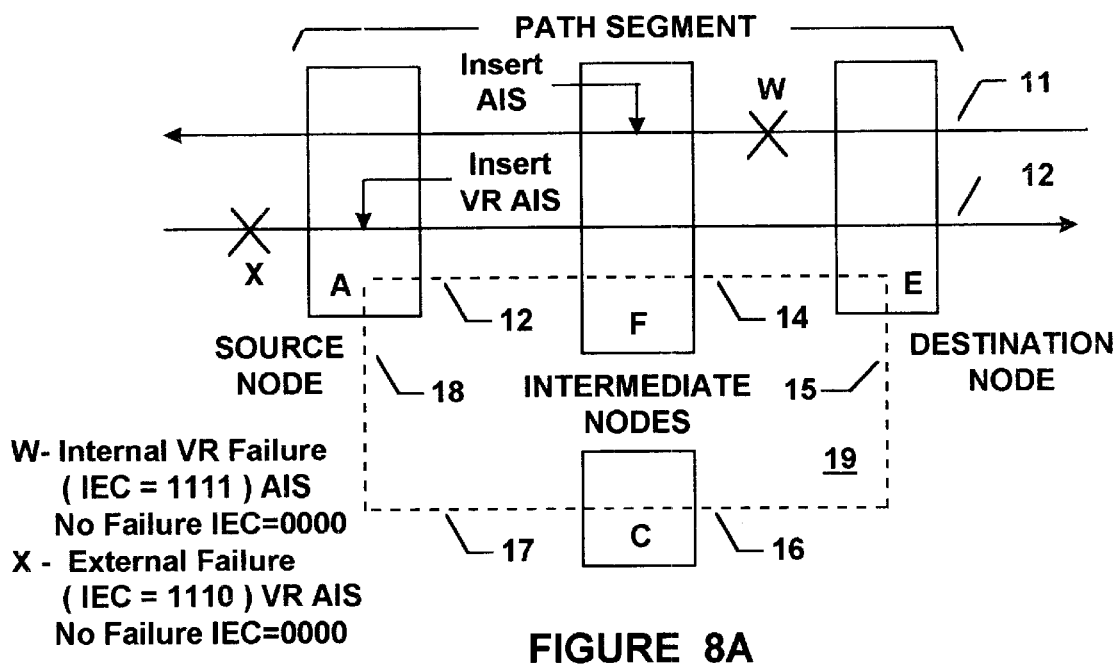
FIG. 8A shows the handling of internal and external failures to the virtual ring with a network defect occurring within the virtual ring.

In FIG. 8A is shown how conventional SONET Alarm Indication Signals (AIS) and our new VR AIS are inserted into the SONET overhead when the fault is external to the path segment, and when the fault is internal to the path segment. In the prior art, if a fault is detected at "W" an AIS (Alarm Indication Signal) signal is inserted at node F as shown. Although not shown, if a fault occurs in line 11 between nodes A and F, the prior art AIS signal will be inserted at node A. With the present invention, when a fault is external to the path segment, such as fault "X", the new VR AIS signal is inserted at node A as shown.

To distinguish between AIS and VR AIS signals, new coding is utilized as shown on FIG. 8A. In the prior art and with the present invention, when there is no fault detected, the IEC code equals 0000. In the prior art, when there is a fault detected, IEC=1111. With the present invention, when there is a fault detected outside of the virtual ring, IEC=1110. Also, with the present invention, when there is a fault detected within the virtual ring, IEC=1111.

In FIG. 9 is shown a flow chart of the parity bit Incoming Error Count (IEC) operation in accordance with the teaching of the present invention. Incoming to the implemented virtual ring (VR) is an "IEC Source At VR Source Node A" as shown in FIG. 9. This is the parity error count coming into VR source node A from external to ring 19, and is contained in the B3 byte of the POH. At block 38 a determination is first made if there is an incoming AIS error. If the answer is no, the program progresses to block 39 to read the B3 byte and determine the number of parity errors incoming to the VR source node. The number of incoming B3 parity errors is then written into the new IEC field (bits B4–B7) in the Z3 byte of the POH at block 41. At block 42 the system computes a compensated B3 value that takes into account the parity of the parity bits in the new Z3 byte and inserts the compensated B3 value into the B3 byte of the POH to be carried to destination node E.

If an incoming AIS error is detected at block 38, the program branches to block 40 and writes the code 1110 into the IEC field of the Z3 byte. The program then progresses to block 42 where the system computes a compensated B3 value that takes into account the parity of the parity bits in the new Z3 byte and inserts the compensated B3 value into the B3 byte of the POH to be carried through intermediate nodes, such as node F, to destination node E.

Figure 9A:
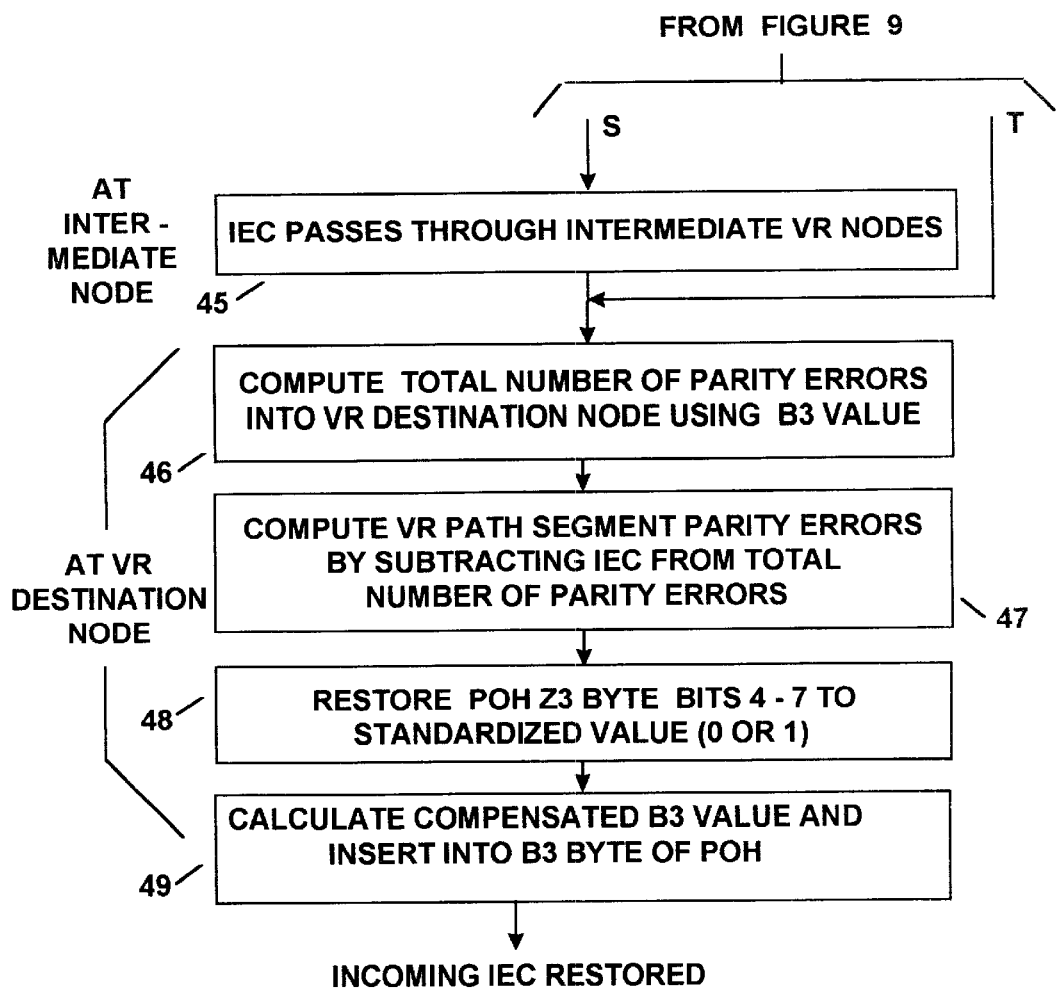

At intermediate node F, block 43 of the program again checks for any conventional incoming AIS errors. If there are no incoming AIS errors detected the IEC that is checked it is passed via lead S to block 45 in FIG. 9A and passes through any other intermediate nodes to destination node E. If an incoming AIS error is detected the program progresses instead to block 44 where the program writes the code 1111 into the IEC field of the Z3 byte. Then the program passes this new code to VR destination node E via lead T to block 46 in FIG. 9A.

Per block 46, at VR destination node E the system processor calculates the number of parity errors at VR destination node E by using the compensated B3 value calculated at VR source node A. Then, at block 47 the system processor computes the number of parity errors introduced in the VR path segment. Next, at block 48, the system processor restores bits B4–B7 of the Z3 POH byte to their standardized value, which is all ones or zeroes.

Finally, at block 49 the system processor calculates the compensated B3 value, which takes into account the number of errors and changes the Z3 byte back to its standardized value, and inserts it into the B3 byte of the POH before it exits the VR. At this point the Incoming Error Count (IEC) is restored to the proper value that is of use to a node adjacent to the VR.

While what has been described herein is the preferred embodiment of the invention, it should be understood that numerous changes may be made without departing from the spirit and scope of the invention. For example, the number of frames used to make up the multi-frame message may be changed, or a CRC code instead of a parity code as part of the multiframe, or the number of bits and/or the use of the bits within the multi-frame message may be changed

What is claimed is:

1. A method for restoring service in a path segment of a SONET communications network comprised of a plurality of nodes interconnected by a plurality of line segments using a virtual ring topology to establish a protection ring to bypass defective line segments and line terminating equipment that normally carry communications signals between a source node and a destination node of said path segment, and only when a defect is within said path segment and not external to said path segment, and wherein said network has a SONET path overhead that includes parity error compensation, said method comprising the steps of:

determining the number of parity errors incoming to said source node of said path segment or detecting said SONET path defect;

creating a message at said source node, said message being inserted into and carried in a previously unused byte of the SONET path overhead, said message being used to carry information from said source node to said destination node;

writing said number of incoming parity errors into said message;

computing the total number of parity errors arriving at said destination node;

computing the number of parity errors introduced only in said path segment by subtracting the number of incoming parity errors written into said message from the total number of parity errors computed to be arriving at said destination node, said parity errors introduced in only said path segment being used to cause said protection ring switching only when said path segment is determined to be defective by exceeding said predetermined number of parity errors in said path segment; and switching to said protection ring to carry said communications signals and bypass said path segment only when it is determined to be defective by exceeding a predetermined number of parity errors in said path segment or by detecting a SONET path defect.

2. The method in accordance with claim 1 further comprising the step of:

computing a compensated value of said parity errors which takes into account the parity error information carried in said message, and inserting said compensated value into said SONET path overhead byte at said source node to be carried to said destination node.

3. The method in accordance with claim 2 further comprising the steps of:

removing said parity error information at said destination node after determining the number of parity errors occurring in the path segment; and writing the compensated value of said parity errors in said SONET path overhead at said destination node to reflect the incoming parity errors coming into said path segment at said source node and the number of parity errors occurring in the path segment before said parity error information is transmitted outside said path segment from said destination node.

4. The method in accordance with claim 3 further comprising the step of:

writing a standardized set of bits in said previously unused path overhead byte at said destination node before said path overhead byte is transmitted outside said path segment.

5. The method in accordance with claim 4 further comprising the step of:

computing a new compensated value of said parity error information in the SONET path overhead that replaces compensation for parity error information carried in said message and adds compensation for parity errors that occur in said path segment before said parity error information is transmitted outside said path segment.

6. A method for use in a SONET communications network for addressing individual nodes in a virtual ring of a path segment that normally carries communications signals between a source node and a destination node of said ring, wherein said path segment is comprised of a plurality of nodes interconnected by a plurality of line segments using ring topology to establish a protection ring to bypass said path segment when it is determined to be defective, and wherein said network has a SONET path overhead that includes a parity byte for carrying parity error compensation, said method comprising the steps of:

assembling a message at said source node, said message containing both said source node and destination node addresses;

placing said message in a previously unused byte of the SONET path overhead for transmission to other nodes in said virtual ring by breaking up the message into a number of segments and each segment is transmitted in one of a number of successive transmissions of said previously unused path overhead byte;

receiving in the node of said virtual ring identified by said destination node address the segments of said message transmitted over said number of successive transmissions of said previously unused path overhead byte; and assembling said received segments of said complete message into said message at said destination node.

7. The method in accordance with claim 6 further comprising the steps of:

placing other information in said message segments for transmission from said source node to said destination node via said previously unused SONET path overhead byte;

extracting said other information from said message segments received at said destination node; and acting on said other information contained in said message received at said destination node.

8. The method in accordance with claim 7 further comprising the step of:

adding a framing bit to each of said message segments transmitted using said previously unused path overhead byte, said framing bit being used at said destination node to assemble said received segments of said message into said message.

9. The method in accordance with claim 8 wherein said message assembled at said source node has a number of bits larger than the number of bits in said previously unused path overhead byte used to carry said message to said destination node, and said message segments are placed in successive transmissions of said previously unused SONET path overhead byte for transmission to said destination node in a multi-frame operation.

10. The method in accordance with claim 9 wherein some of said other information is transmitted in a single transmission of said previously unused path overhead byte.

11. The method in accordance with claim 10 wherein said other information includes a number of parity errors received at said source node in said parity byte of the SONET path overhead, and further comprising the steps of:

subtracting said last mentioned number of parity errors received at said source node, and included in said message, from the total number of parity errors received at said destination node, said total number of parity errors being the number of parity errors coming into said source node plus the number of parity errors occurring in said path segment of said ring, to determine the number of parity errors occurring in the path segment of said virtual ring; and establishing said protection ring to bypass said path segment when it is determined to be defective by exceeding a pre-determined number of parity errors in said path segment.

12. The method in accordance with claim 11 further comprising the step of:

compensating parity error information in said path overhead at said source node to account for the contents of said message carrying path overhead byte.

13. The method in accordance with claim 12 further comprising the steps of:

removing said parity error information compensation at said destination node after determining the number of parity errors occurring in the path segment of said virtual ring; and rewriting the parity error compensation in said path overhead at said destination node to reflect the total parity errors coming into said source node and the number of parity errors occurring in the path segment before said parity error information is transmitted outside said destination node.

14. The method in accordance with claim 12 further comprising the step of:

writing a standardized set of bits in said message carrying path overhead byte at said destination node before said byte is transmitted outside said destination node.

15. The method in accordance with claim 7 wherein said other information includes the number of parity errors received at said source node from external to said path segment, and further comprising the steps of:

subtracting said last mentioned number of parity errors received at said source node, and included in said last mentioned message, from the total number of parity errors received at said destination node, said total number of parity errors being the number of parity errors coming into said source node plus the number of parity errors occurring in said path segment, to determine the number of parity errors occurring in said path segment; and establishing said protection ring to bypass said path segment when it is determined to be faulty by exceeding a pre-determined number of parity errors introduced in said path segment.

16. The method in accordance with claim 15 further comprising the step of:

compensating parity error information in said path overhead at said source node to account for the contents of said message carrying path overhead byte.

17. The method in accordance with claim 16 further comprising the steps of:

removing said parity error information compensation at said destination node after determining the number of parity errors introduced in the path segment of said virtual ring; and rewriting the parity error compensation in said path overhead at said destination node to reflect the total parity errors coming into said source node and the number of parity errors introduced in the path segment before said parity error compensation is transmitted outside said destination node.

18. The method in accordance with claim 17 further comprising the step of:

writing a standardized set of bits in said message carrying path overhead byte at said destination node before said last mentioned byte is transmitted outside said virtual ring.

19. The method in accordance with claim 18 further comprising the step of:

adding a framing bit to each of said message segments transmitted using said previously unused path overhead byte, said framing bit being used at said destination node to assemble said received segments of said message into said message.

20. A method for restoring service in a path segment of a SONET communications network comprised of a plurality of nodes interconnected by a plurality of line segments using a virtual ring topology to establish a protection ring to bypass defective line segments and line terminating equipment that normally carry communications signals between a source node and a destination node of said path segment, and only when a defect is within said path segment and not external to said path segment, and wherein said network has a SONET path overhead that includes parity error compensation, said method comprising the steps of:

determining the number of parity errors incoming to said source node of said path segment or detecting said SONET path defect;

creating a message at said source node, said message being inserted into and carried in a previously unused byte of the SONET path overhead, said message being used to carry information from said source node to said destination node;

writing said number of incoming parity errors into said message;

computing the total number of parity errors arriving at said destination node;

computing the number of parity errors introduced only in said path segment by subtracting the number of incoming parity errors written into said message from the total number of parity errors computed to be arriving at said destination node, said parity errors introduced in only said path segment being used to cause said protection ring switching only when said path segment is determined to be defective by exceeding said pre-determined number of parity errors in said path segment; and switching to said protection ring to carry said communications signals and bypass said path segment only when it is determined to be defective by exceeding a predetermined number of parity errors introduced in said path segment or by detecting a SONET path defect.

21. A method for use in a SONET communications network for addressing individual nodes in a virtual ring of a path segment that normally carries communications signals between a source node and a destination node of said ring, wherein said path segment is comprised of a plurality of nodes interconnected by a plurality of line segments using ring topology to establish a protection ring to bypass said path segment when it is determined to be defective, and wherein said network has a SONET path overhead that includes a parity byte for carrying parity error compensation, said method comprising the steps of:

assembling a message at said source node, said message containing both said source node and destination node addresses;

placing said message in a previously unused byte of the SONET path overhead for transmission to other nodes in said virtual ring by breaking up the message into a number of segments and each segment is transmitted in one of a number of successive transmissions of said previously unused path overhead byte;

receiving in the node of said virtual ring identified by said destination node address the segments of said message transmitted over said number of successive transmissions of said previously unused path overhead byte;

assembling said received segments of said message at said destination node;

placing other information in said message segments for transmission from said source node to said destination node via said previously unused SONET path overhead byte;

extracting said other information from said message segments received at said destination node; and acting on said other information contained in said message received at said destination node.

* * * * *